US011618593B2

(12) United States Patent
Xie et al.

(10) Patent No.: US 11,618,593 B2
(45) Date of Patent: Apr. 4, 2023

(54) ENVIRONMENT FORMING APPARATUS SUITABLE FOR BIOLOGICAL CULTIVATION IN EXTRATERRESTIAL SPACE

(71) Applicants: Chongqing University, Chongqing (CN); Beijing Institute of Technology, Beijing (CN); Shandong Aerospace Electronic Technology Research Institute, Yantai (CN)

(72) Inventors: Gengxin Xie, Chongqing (CN); Yuanxun Zhang, Chongqing (CN); Xiaojun Yang, Chongqing (CN); He Zhang, Chongqing (CN); Zhe Zhang, Chongqing (CN); Youwei Zhang, Chongqing (CN); Xuan Zhou, Chongqing (CN); Miaocheng Weng, Chongqing (CN); Xi Wang, Chongqing (CN)

(73) Assignees: Chongqing University, Chongqing (CN); Beijing Institute of Technology, Beijing (CN); Shandong Aerospace Electronic Technology Research Institute, Yantai (CN)

( * ) Notice: Subject to any disclaimer, the term of this patent is extended or adjusted under 35 U.S.C. 154(b) by 147 days.

(21) Appl. No.: 17/133,917

(22) Filed: Dec. 24, 2020

(65) Prior Publication Data

US 2021/0197988 A1    Jul. 1, 2021

(30) Foreign Application Priority Data

Dec. 26, 2019   (CN) .......................... 201911367743.1

(51) Int. Cl.
*B64G 1/46*      (2006.01)
*B64G 1/48*      (2006.01)
(Continued)

(52) U.S. Cl.
CPC ................. *B64G 1/46* (2013.01); *B64G 1/48* (2013.01); *B64G 1/50* (2013.01); *A01G 9/246* (2013.01);
(Continued)

(58) Field of Classification Search
CPC .................................. B64G 1/46; B64G 1/48
See application file for complete search history.

(56) References Cited

U.S. PATENT DOCUMENTS 3,749,332 A * 7/1973 Gray ........................ B64G 1/46
                                                        47/17
4,015,366 A * 4/1977 Hall, III ................... A01G 3/04
                                                       193/25 E
(Continued)

FOREIGN PATENT DOCUMENTS

CN       101169105 A      4/2008
CN       102415324 A      4/2012
(Continued)

OTHER PUBLICATIONS

First Office Action issued in counterpart Chinese Patent Application No. 201911367743.1, dated Mar. 16, 2021.
(Continued)

*Primary Examiner* — Jessica B Wong
(74) *Attorney, Agent, or Firm* — Westbridge IP LLC

(57) ABSTRACT

Disclosed is an environment forming apparatus suitable for biological cultivation in extraterrestrial space. The apparatus includes a shell and a biological cabin configured in an upper space of the shell. A light management system for importing light of biological growth from external world is configured in the upper space, a thermal management system for at least balancing a temperature of the upper space and a water supplying system and configured for providing water for creatures growth are both configured on the shell. The (Continued)

biological cabin and the like are set at the appropriate part of the shell, an environment which is relatively suitable for biological growth or cultivation can be created and simulated on an extraterrestrial star, a condition is provided for ecological cultivation of the extraterrestrial space, an ecosystem of the extraterrestrial space can be formed, and a smooth extraterrestrial space biological experiment process is guaranteed.

9 Claims, 14 Drawing Sheets

(51) Int. Cl.
    *B64G 1/50*     (2006.01)
    *A01G 9/24*     (2006.01)
    *B64G 1/10*     (2006.01)

(52) U.S. Cl.
    CPC .............. *A01G 9/247* (2013.01); *A01G 9/249* (2019.05); *B64G 1/105* (2013.01)

(56) References Cited

U.S. PATENT DOCUMENTS

| | | | | |
|---|---|---|---|---|
| 4,244,146 | A | * | 1/1981 | Kranz .................. A01G 9/14 47/17 |
| RE31,023 | E | * | 9/1982 | Hall, III .................. A01G 7/00 193/25 E |
| 4,583,321 | A | * | 4/1986 | Stanhope ................ A01G 7/00 47/17 |
| 2011/0287705 | A1 | * | 11/2011 | Kamp .................. A01G 9/246 454/239 |
| 2019/0390868 | A1 | * | 12/2019 | Reid .................... B01D 53/62 |

FOREIGN PATENT DOCUMENTS

CN          103477911 A     1/2014
CN          106234197 A    12/2016

OTHER PUBLICATIONS

Guo et al., Development of an Improved Ground-based Prototype of Space Plant-growing Facility, Space Medicine & Medical Engineering, vol. 20, No. 1, pp. 51-56, China, dated Feb. 2007.

* cited by examiner

ENVIRONMENT FORMING APPARATUS SUITABLE FOR BIOLOGICAL CULTIVATION IN EXTRATERRESTIAL SPACE

The present disclosure claims the benefits of Chinese Patent Application No. 201911367743.1 entitled "ENVIRONMENT FORMING APPARATUS FOR BIOLOGICAL CULTIVATION IN EXTRATERRESTIAL SPACE", which was filed on Dec. 26, 2019, and the entire disclosure of which is hereby incorporated by reference, in its entirety, for all that it teaches and for all purposes.

TECHNICAL FIELD

The disclosure relates to an experimental device, in particular to an environment forming apparatus for biological cultivation in extraterrestrial space.

BACKGROUND

The earth's resources are huge, but due to the development of society, the increase in the absolute number of people, and the further expansion of resource development, the per capita share of the earth's resources has declined year by year.

With the further development of science and technology, the possibility of human beings to land on other stars has gradually evolved to reality. Nowadays, when the earth's resources are gradually scarce due to excessive development. The present era poses a relatively realistic problem to the scientific research that how to use extraterrestrial stars to cultivate living creatures (animals and plants).

The environment of other star in extraterrestrial space is very different from that of the earth, and is not for the growth and reproduction of life on earth. Therefore, it is necessary to study an environment that can be used in extraterrestrial space for biological cultivation on stars other than the earth to obtain the data of organisms cultivated on extraterrestrial bodies, providing a theoretical basis for the use of resources on extraterrestrial stars.

Therefore, there is a need for a cultivation apparatus for the ecosystem of extraterrestrial space, which can create and simulate an environment relatively for biological growth or cultivation on extraterrestrial stars, providing conditions for ecological cultivation of extraterrestrial space. It can form an ecological circle in the extraterrestrial space, guaranteeing a smooth progress of biological experiments in the extraterrestrial space.

SUMMARY

On that account, the present disclosure provides a cultivation apparatus for biological cultivation in extraterrestrial space, which can create and simulate an environment relatively for biological growth or cultivation on extraterrestrial stars, providing conditions for ecological cultivation of extraterrestrial space, forming an ecological circle in the extraterrestrial space, and guaranteeing a smooth progress of biological experiments in the extraterrestrial space.

The present disclosure provides an environmental forming apparatus for biological cultivation in extraterrestrial space including: a shell and a biological cabin configured in an upper space of the shell, a light management system configured in the upper space and for importing light of biological growth from external world;

a thermal management system configured on the shell and for at least balancing temperature of the upper space and a water supplying system configured on the shell and for providing water for creatures growth; and, a water supplying system configured on the shell and configured for providing water for creatures growth.

In an embodiment, the light management system includes a light guide tube and a light-transmitting plate, the light-transmitting plate is configured on an cover plate located on top of the shell in manner of enabling light to go through inside or outside of the shell, a light lead-in end and a light lead-out end are configured on the light-transmitting tube, and the light guide tube is configured on the cover plate of the shell in a manner that the light lead-in end is directly facing the light-transmitting plate.

Further, the water supplying system includes a water cabin and a water pump transporting water to the biological cabin, the water cabin is located in a lower space of the shell relative to the biological cabin.

Further, the water supplying system further includes a frost cracking water supplying device and a sealed water-supplying container, the water supply sealed container is filled with water, upon a low temperature that water is frozen, the water supply sealed container is disabled, and after the temperature is back to normal and ice is melt, water is leaked from the water supply sealed container to a needed area in the biological cabin.

Further, an oxygen generating device that is configured to control oxygen releasing is set inside the biological cabin.

Further, the thermal management system includes a heat insulation material layer set on an outer surface of the shell and an active temperature control device for keeping the temperature in the shell in a set range, the active temperature control device comprises a refrigeration fin clung on the shell.

Further, the thermal management system further includes a radiator, the radiator is clung to a side of the refrigeration fin far away from the shell, the radiator is fastened on the outer surface of the shell through a thermal insulation fastening assembly, pressing the refrigeration fin on the outer surface of the shell.

Further, the thermal insulating fastening assembly includes a heat insulation base fastened on the shell in an installation direction and a connecting nail, the connecting nail is configured to fasten the radiator on the thermal insulation base and press the refrigeration fin on the outer surface of the shell through the radiator.

Further, the active temperature control device further includes an electric heating sheet set inside the shell.

Further, a bottom of the shell is further connected with a second shell, second shell and the shell are separately sealed.

The beneficial effects of the present disclosure include: in an environment forming apparatus for biological cultivation in extraterrestrial space, a biological cabin and the like are set at the appropriate part of the shell, an environment which is relatively suitable for biological growth or cultivation can be created and simulated on an extraterrestrial star, a condition is provided for ecological cultivation of the extraterrestrial space, an ecosystem of the extraterrestrial space can be formed, and a smooth extraterrestrial space biological experiment process is guaranteed. The apparatus disclosed by the present disclosure is combined with a corresponding cultivation substrate and a monitoring system, so that biological experiments of the human on the star other than the earth can be preliminarily realized. A research foundation and experiences are provided for establishing other star bases on the moon for human in the future. The apparatus has great theoretical and practical significance.

BRIEF DESCRIPTION OF THE DRAWINGS

The present disclosure will be further described below with reference to the drawings and embodiments. In the drawings.

DETAILED DESCRIPTION OF THE EMBODIMENTS

Figure 1:
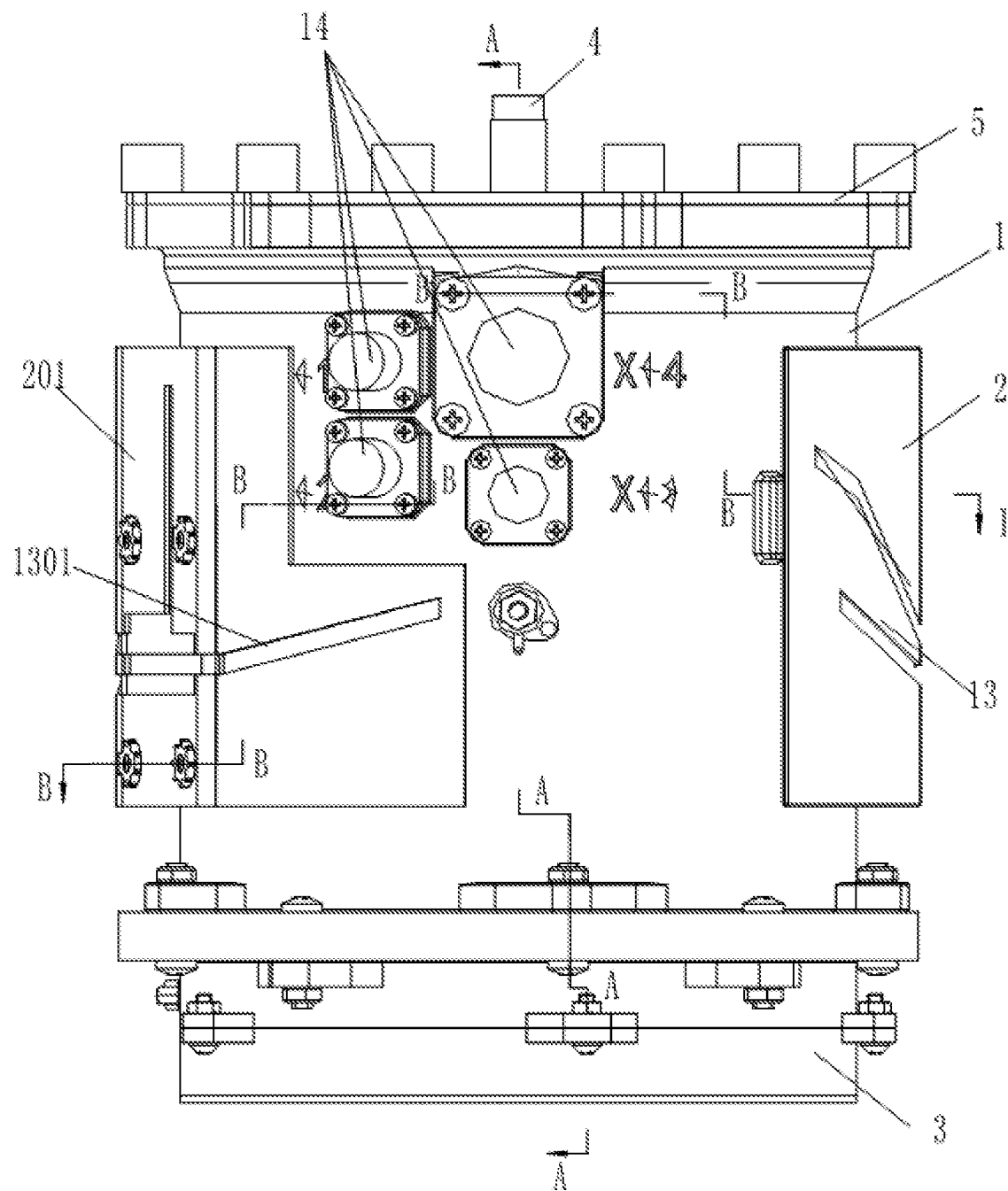
FIG. 1 is a schematic view of an external structure of an environment forming apparatus for biological cultivation in extraterrestrial space of the present disclosure.
Figure 2:
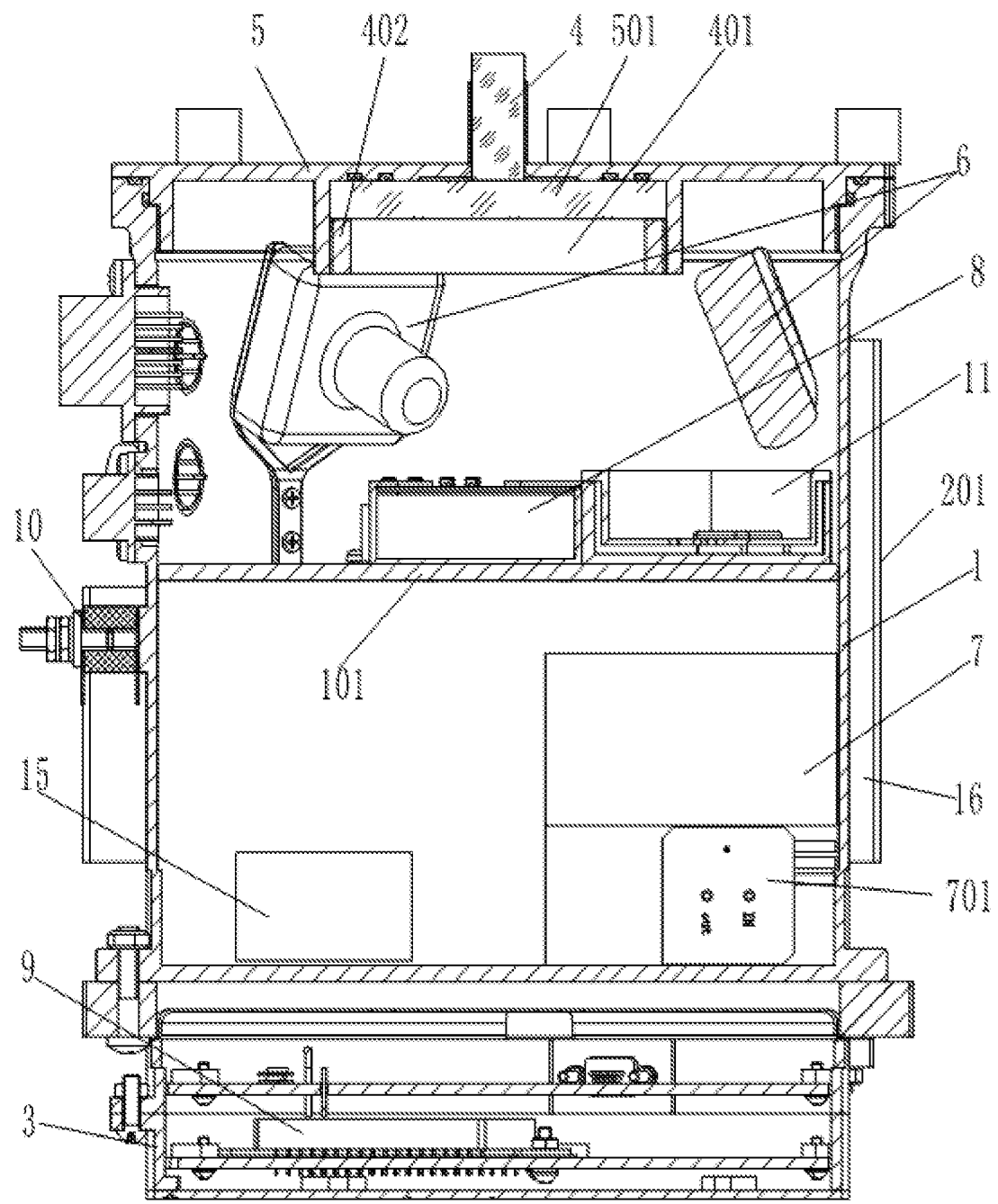
FIG. 2 is a cross-sectional view along A-A of FIG. 1.
Figure 3:
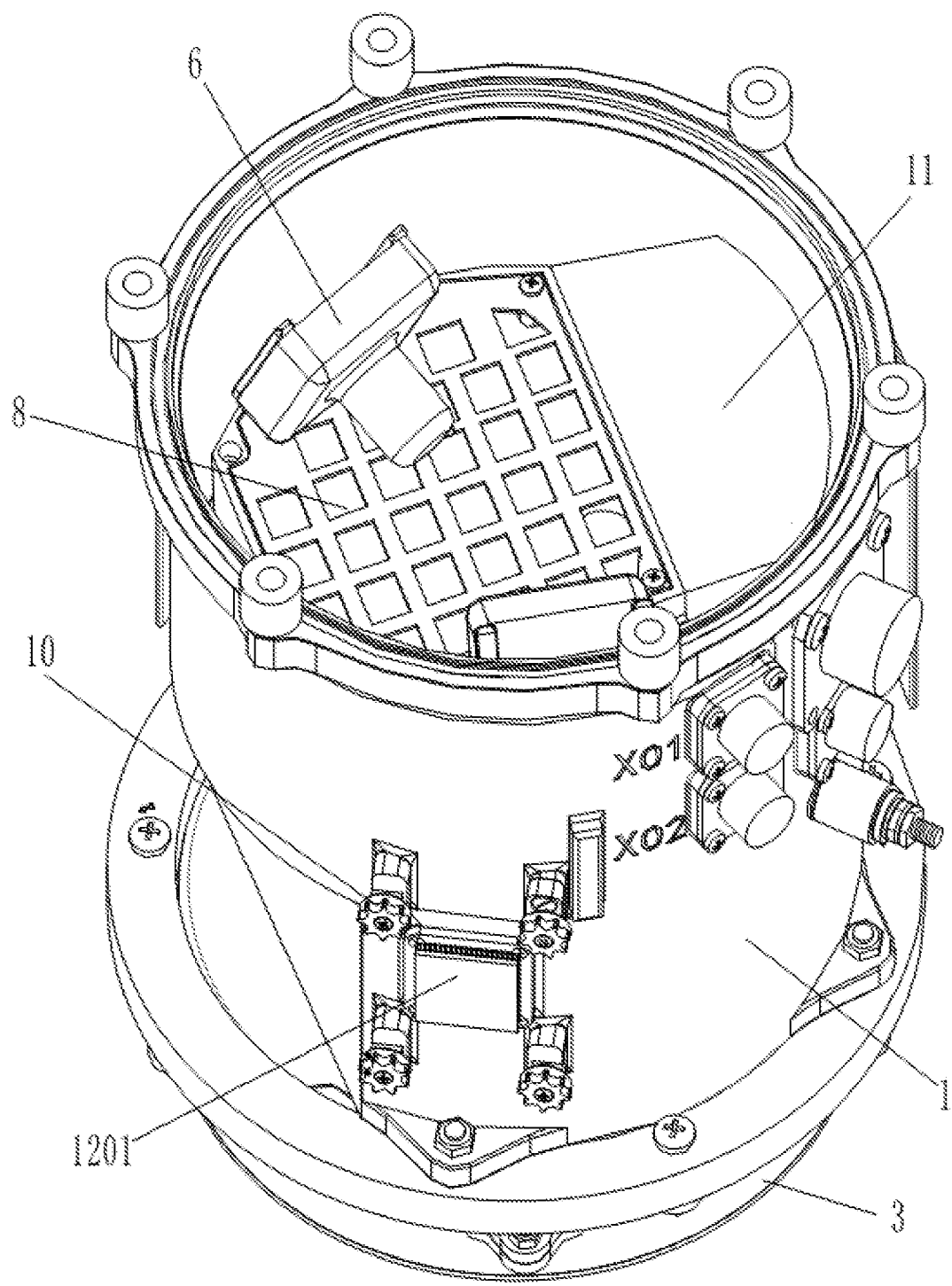
FIG. 3 is a perspective view of the environment forming apparatus for biological cultivation in extraterrestrial space of the present disclosure (with a cooling sink removed)
Figure 4:
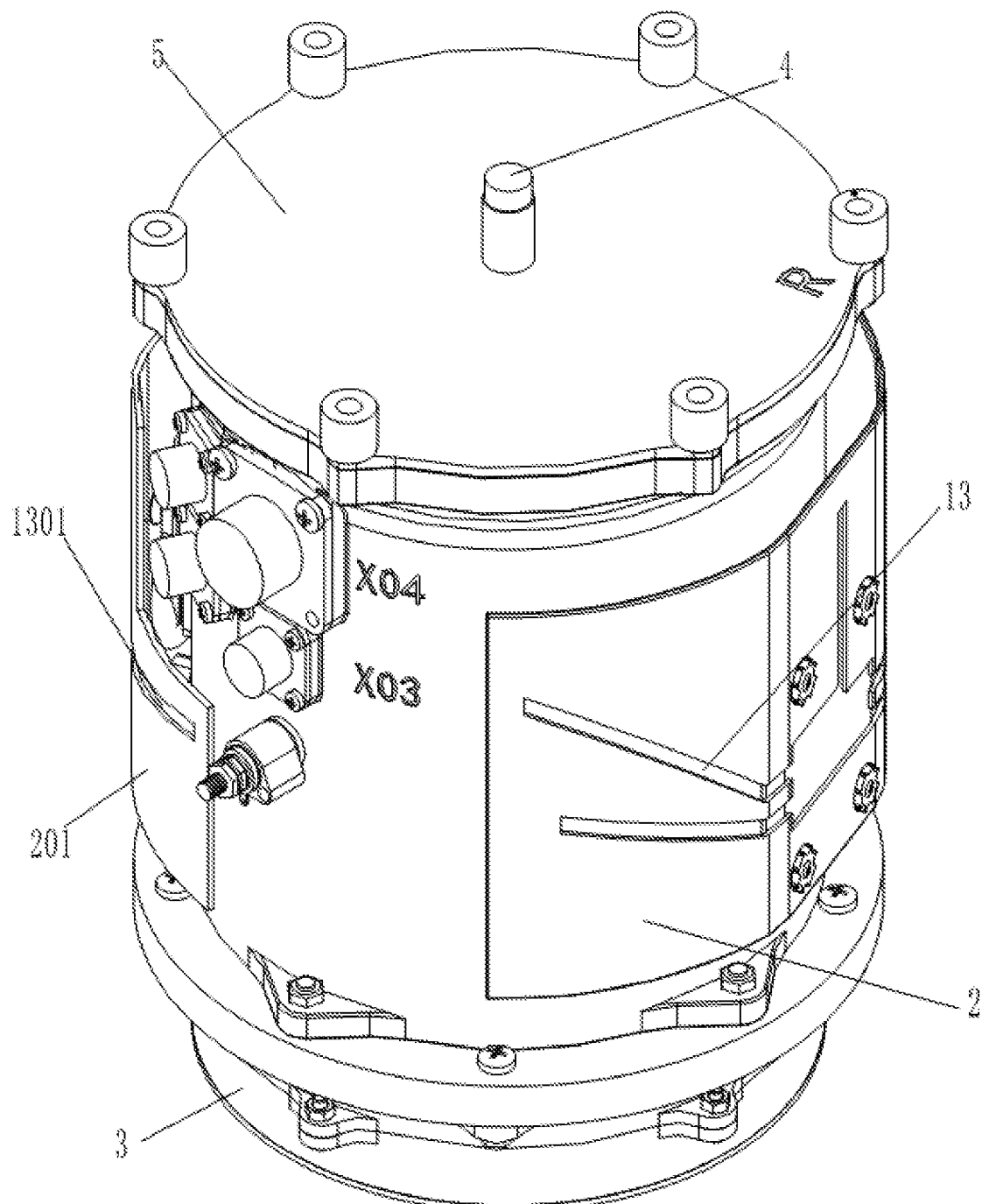
FIG. 4 is a perspective view of the environment forming apparatus for biological cultivation in extraterrestrial space of the present disclosure.

As shown in the FIGS. 1 to 14: an environment forming apparatus for biological cultivation in extraterrestrial space includes a shell 1 and a biological cabin 18 arranged in the upper space of the shell 1, and the upper space of the shell 1 is also configured with a light management system 23 for importing light for biological growth from the external world.

A thermal management system 20 for at least balancing the temperature of the upper space and a water supplying system 24 for providing water for creatures growth are also configured on the shell 1.

The shell 1 is sealed from the external world. Before present system leaving the earth for a target extraterrestrial space, the shell 1 is sealed with air environment the same as that of the earth, which is not described in detail here. The biological cabin 18 is located in the shell 1, providing a basis to creatures growth. The providing of the basis refers to providing a basic environment, for example soil and the like, for the survival and growth of plants, animals and microorganisms.

The light management system 23 is used for forming a light environment suitable for biological survival and growth at least in the biological cabin 18 (may be in the entire shell). The light management system 23 providing the light environment refers to creating environment for plants to have photosynthesis and for animals to have essential light through guiding natural light from the external world or generating simulation natural light. Different light generating modes are used according to different extraterrestrial spaces, like the moon for instance, a mode of guiding could be used for generating light. For the permanently-dark extraterrestrial space however, a mode of emitting fitting is used to generate a light environment similar to the natural light. However, generating a light environment similar to the natural light by a mode of emitting fitting is belonging to the known art, and it is not described in detail here.

The thermal management system 20 is used to create a temperature environment suitable for the survival and growth of creatures at least in the biological cabin 18 (usually in the entire shell). In order to ensure the normal survival and growth of the creatures (animals, plants and microorganisms) in the biological cabin 18, a suitable temperature (namely similar to the temperature of the earth) is needed to be provided inside the biological cabin 18 (or in the entire shell). Different thermal management modes are needed for different extraterrestrial spaces. For example, during the day time on the moon, it is needed to dissipate heat outward and to refrigerate appropriately, ensuring that the temperature is relatively lower than the temperature of the moon to make it suitable for the survival and growth of creatures. During the night time on the moon or on any other stars or spaces with lower temperature, if it is needed to keep the temperature at a certain level, an inner part of the shell is heated. Of course, a temperature keeping structure is needed to be designed in this case, which is not described in detail here. The thermal management system 20 can adopt regular air conditioner structure with a little further remodeling. It can further adopt heating fin structure, and refrigerating fin structure, all of those can realize the purpose of the disclosure. Since the heating fin structure and the refrigerating fin structures are solid structures, it is more convenient to have them transported to the extraterrestrial space through complex procedures.

The water supplying system 24 provides water for the survival and growth of creatures in the biological cabin 18. A regular design of the water supplying system 24 is realized through a water cabin and a water pump 701. A flow is appropriately controlled and a moisture for survival and growth is ensured.

In this embodiment, the biological cabin 18 is located in the upper space of the shell 1 and is independent and sealed correspondingly. The biological cabin 18 includes a creature growing substrate 8. The creature growing substrate 8 includes a box 804, a growing substrate layer 803 and a fastening layer. The fastening layer of growing substrate layer includes a net-shaped cover fastening layer 801 and a water-soluble material layer 802, the water-soluble material layer 802 and the net-shaped cover fastening layer 801 are sequentially fastened and covered from down to up on the growing substrate layer, in order to fasten the growing substrate in the box 804. A mesh aperture diameter of the net-shaped cover fastening layer 801 is larger than a hole aperture that is needed for creatures to grow. Of course, the box 804 could be set to have a relatively bigger volume and base area according to the size of the shell 1, which is not described in detail here.

According to the figures the shell 1 is a sealed structure. When launched to a set star from the earth, inside the sell 1 there is air sealed for the growth of creatures (in this embodiment it can be flies, yeasts, potatoes, succulents, camel thorns, etc). The biological cabin 18 is a relatively independent space for creature cultivation in the shell 1, which is located in the upper space of the shell 1. A diameter of the shell 1 is about 170 mm, a height of the shell 1 is about 200 mm, which is in a cylinder shape and is made of aluminum alloy, capable for executing creature cultivation experiments. The shell 1 is subjected to a hard anode oxidation treatment to improve the performance of the aluminum alloy shell 1, including corrosion resistance, wear resistance, weather resistance, insulation and adsorption, etc. After the hard anode oxidation treatment, a hard Al2O3 film is formed on the surface of the aluminum alloy, the thickness of which is 25-150 um.

The growing substrate layer 803 is normally made of soil suitable for the growth of plants (the soil is dry during the transportation process and does not have the condition for plant seeds to grow and germinate) and corresponding plant seeds and animal eggs (in this embodiment they can be flies, yeast, potatoes, succulents, camel thorns, etc). In order to avoid the circumstances of dumping and scattering during the launching and transportation process, a method that covering a water-soluble material layer (usually using water-soluble cotton, of course it could also be protective layer made of water-soluble fertilizer with set strength) on the surface of the soil in the box is adopted. When used in the set star (the moon in this embodiment), the water-soluble material layer is dissolved by watering which meanwhile provides water source for the growth of the plants. The water-soluble material layer 802 is not affecting the growth of the plants. Meanwhile, to ensure that it will not scatter during the transportation with violent shaking, it is fastened through the net-shaped cover fastening layer. The net-shaped cover fastening layer 801 covers on the surface of the water-soluble material layer and is fastened at edges of an opening of the box, forming a solid whole. Meanwhile, during the process of the growth of the plants, the mesh aperture diameter ensures plants to grow upward and go through. The box and the net-shaped cover fastening layer can be made from polymer materials, which is not described in detail here.

After the apparatus of the present disclosure arrives the star (the moon in this embodiment) with a space ship, the sun light on the moon is imported, a proper temperature is adjusted and the water is imported. When the plant seeds of the growth substrate layer is under a right condition for growing, the plant seeds start to germinate, creatures inside the load constitutes a micro ecosystem with producers, consumers and decomposers. In particular, the plants produce oxygen and food for all creatures to "consume". The flies, as consumers, and the yeasts as decomposers, produce carbon dioxide through consuming oxygen, supporting the plants to perform photosynthesis. Besides, the yeasts can grow through decomposing the waste from the plants and the flies, which can also be the food for the flies.

In this embodiment, multiple period areas are set in the biological cabin 18, the multiple period areas are configured with a creature growing substrate layer and a fastening layer respectively and the water supplying system 24 provides water to the multiple period areas sequentially according to a set period. For example, in the moon, based on the loop of the day time of the moon and the night time of the moon. It can be designed that one period area is activated during one day time period of the moon (the rest of the period areas are not watered), and during the night time of the moon, it is deactivated. A second period area is watered to form a survival and growth environment during a next day time of the moon in order to have long term detection on the growth, obtaining data with higher efficiency. The water pump 701 and other containers can be adopted for automatic water supplying (method of bottom valve and the like).

In this embodiment, the water supplying system 24 includes a water cabin 7 and a water pump 701 (electromagnetic water pump) for transporting water to the creature growth substrate. The water cabin is located in a lower space in the shell 1 relative to the biological cabin 18.

An exit terminal of the water pump 701 is located in the net-shaped cover fastening layer, transporting the water sequentially from the net-shaped cover fastening layer and the water-soluble material layer to the creature growth substrate layer. According to the figures, the water cabin is located at a lower position of the shell 1 relative to the biological cabin 18. A blocking plate 101 for separating the biological cabin 18 and the water cabin 7 is provided inside the shell 1, the blocking plate 101 is fastened inside the shell 1 (adopting the existing mechanically fastening method). The creature growing substrate 8 is fastened on the blocking plate 101. No special limitation is applied on the type of the water pump 701 701, for example, the water pump 701 701 can be an electromagnetic water pump 701. A sealed water storage bag 702 for containing water is provided inside the water cabin 7. The water storage bag can be, for example, produced by Shanghai Lechun Biotechnology Co., Ltd. with a capacity of 20 ml. The water storage bag is fastened inside the water cabin 7. The electromagnetic water pump 701 is fastened at a bottom of a base of the water cabin 7 through using such as GD414 glue. The connection and transportation relationship between the electromagnetic water pump 701 and the water storage bag as well as the creature growing substrate are not described in detail here.

To simplify the structure and ensure that the water in the water cabin 7 won't come out (it will form various position that makes the water flow according to the direction of forces) through the water pump 701 and tubes of the water pump 701 during the process of being transported to a target extraterrestrial space. Some vaseline 7012 is filled in a section of an exit tube 7011 of a pump, which is efficient on sealing. After arriving at the target location and regains a proper temperature, the vaseline melts or is flushed out by the water pressure of the pump, then it can normally use the water supplying system.

In this embodiment, the water supplying system 24 further includes a frost cracking water supplying device 19, the frost cracking water supplying device 19 includes a sealed water-supplying container 17 set on an upper space of a corresponding period area, the water supplying sealed container is disabled under a low temperature with frozen water condition, and after the temperature is regained with the ice melted, water leaks to the corresponding period area. To replace the water pump 701, the multiple period areas of this structure can adopt the characteristic of expansion when water becomes ice, using the low temperature of the environment between two growing periods to freeze the water inside the container and expand and crack the container. Further, after the next period regains the temperature and the ice melts, water flows out from the cracked hole toward a corresponding growing substrate, regaining growing periods, which is suitable for extraterrestrial spaces with obvious temperature changes.

In this embodiment, the period areas are two, respectively a first period area and a second period area which are sealed and separated from each other in the box 804. The first period area and the second period area are respectively configured with a creature growing substrate layer and a fastening layer. An exit end of the water pump 701 is located in the first period area, and through a net-shaped cover fastening layer and a water-soluble material layer of the first period area to transport the water to the creature growing substrate of the first period area. The water supplying system 24 further includes a frost cracking water supplying device 19 including a sealed water-supplying container 17 set on the upper space of a net-shaped cover fastening layer in the second period area, the sealed water-supplying container 17 is filled with water, and the sealed water-supplying container 17 can be disabled under the condition of low-temperature water icing. After the temperature is restored and the ice melts, water leaks to a creature growing substrate layer of the second period area. The star suitable for the embodiment of the disclosure is the moon, with a period of day time of the moon, and a period suitable for the plant growth is the period of day time of the moon. The creature growing substrate of the present embodiment is used as two periods of day time of the moon, creatures (plants in this embodiment, and of course, an animal region and a plant region can also be divided in the first period area, and are respectively used for culturing plants and animals) are cultivated in a first period of day time of the moon (14 days) in the first period area, and the water is provided by an electromagnetic pump. No water is added in the second period area during the first period of day time of the moon and plant seeds are in a dormant mode. During a period of night time of the moon following the first period of day time of the moon, the creature cultivation system is not operating, spending the period of night time of the moon under the low temperature of the moon. At this time, the water in the sealed water-supplying container 17 is frozen and expanded under the low-temperature environment of the moon, and the sealed water-supplying container 17 is expanded and cracked. Conditions of temperature and illumination are restored during a second period of day time of the moon. Since the sealed water-supplying container 17 has been disabled by being expanded and cracked, water flows to a creature growing substrate layer of the second period area, creating a condition for plant growth, enabling a second round of plant cultivation.

The sealed water-supplying container 17 can be a common glass bottle, a metal container with a weak score 1701 (similar to a score of a burst plate), etc., which only needs to have features that expand and crack after the water is frozen, and generally the weak score should be at the bottom of the container.

In this embodiment, the water-soluble material layer 802 is made of a water-soluble cotton material layer or water-soluble solid fertilizer plate with humus as a skeleton. The water-soluble cotton can be sufficiently dissolved after watering, ensuring the growth of the plants. The humus soil is the one with plant fibers, the plant fibers, as a skeleton, form a solid trash plate after being mixed with chemical fertilizer (urea), which has certain strength. The fertilizer can be pressed on the creature growing substrate layer through the net-shaped cover fastening layer, and urea dissolution after watering can also provide fertilizer nutrition for the plants.

In this embodiment, the thermal management system 20 includes a heat insulation material layer 16 set on the outer surface of the shell 1 and an active temperature control device 22 used for keeping the temperature in the shell 1 in a set range. The active temperature control device 22 includes an refrigeration fin 12 (1201) clung to the shell 1, which can be smeared by heat-conducting glue. The heat insulation material layer 16 is firstly used to reduce the heat loss of the load as much as possible, mainly in the solar radiation free stage; secondly, the heat insulation material layer 16 is used to isolate the heating of the ambient heat source around the load, mainly in the solar radiation stage.

The refrigeration fin 12 (1201) can provide cold energy for the load under the condition that the external temperature of the solar radiation stage is high. The active temperature control device 22 is used inside the shell for releasing the heat properly, avoiding a terrible growth environment due to over-high temperature. The refrigeration fin 12 (1201) is a semiconductor refrigeration fin of the existing technology. A refrigerating surface is clung to the shell 1 after connected to electricity. A heating surface faces outward to release the heat. The active temperature control device 22 further includes an electronic heating sheet 15 set in the shell 1. Temperature rise heat source is provided through the electric heating sheet, which is suitable for various extraterrestrial spaces. Under the condition that the temperature of the external environment is too low, the temperature is kept constant or kept within a set range according to the temperature in the shell 1.

In the embodiment, the thermal management system 20 further includes an radiator 2 (201), the radiator 2 (201) is tightly clung to the heat dissipation surface of the refrigeration fin and can be coated with heat conduction glue. The radiator 2 is usually made of metal with relatively high heat conduction coefficient, in this embodiment, it is made of copper. According to the figures, the shape of the radiator 2 (201) is adaptive to a shape of the shell and are constituted by arc surfaces. In order to install more easily, two radiators are provided (radiator 2 and radiator 201), facing to each other and covering around an outer part of the shell 1. The structure of one of the radiators avoids a plug-in 14 (grounding, signal transmitting and power channel) during being installed. The two radiators 2 (201) respectively press a corresponding one of the refrigeration fins 12 (1201) on two opposite sides of the shell 1

In this embodiment, the radiator 2 (201) is fastened on an outer surface of the shell 1 through a heat insulation fastening assembly 10, and presses the refrigeration fin 12 (1201) on the outer surface of the shell 1. The heat insulation fastening assembly 10 includes a heat insulation base 1001 fastened on the shell 1 in an installation direction and a connecting nail 1002. The connecting nail 1002 (in order to fasten the radiators on the shell 1, there are generally multiple heat insulation fastening assemblies. For convenience of illustration, only one heat insulation fastening assemble is illustrated here) tightly fastens the radiator on the heat insulation base 1001, and presses the refrigeration fin on the outer surface of the shell 1 through the radiator. As shown in the figures, a hump for installation is set on the outer surface of the shell 1 corresponding to the position of the refrigeration fin, an installation groove approximate to a dovetail groove is formed on the hump for installation. The heat insulation base 1001 is a dovetail block suitable for pairing with the installation groove and is installed in the installation groove. An end of the heat insulation base 1001 is extended out of an opening of the installation groove. The connecting nail 1002 fastens the radiator on the heat insulation base 1001, and a heat insulation pad 1004 is further set between an external big end of the connecting nail 1002 and the radiator. A heat insulation ring 1003 is further set between the radiator and the end of the heat insulation base 1001. As shown in the figures, the heat insulation ring is a conical ring, the top of the conical ring abuts against the terminal portion of the heat insulation base. The bottom of the conical ring abuts against the radiator. A thickness of the heat insulation ring can adjust the force that the connecting nail presses tightly on the refrigeration fin when fastened, ensuring the efficiency of heat conduction.

In this embodiment, the total heat load of the system is 0.48 W, the heating amount on a heating end of a semiconductor refrigeration fin is designed to be 3.05 W. In order to fully expel this portion of heat, avoiding the heat to be accumulated on the heat terminal of the refrigeration fin and cause the COP of the refrigeration fin to decrease, therefore, heat tubes 13 (1301) is adopted to improve the heat conducting capability, and the maximum heat transfer power of the heat tubes should be higher than the heating amount of the semiconductor refrigeration fin.

In this embodiment, the heat tubes 13 (1301) is made by pressing a cylindrical tube with a 3 mm diameter and a 0.15 mm wall thickness. After being pressed, the heat tube becomes a 4 mm wide rectangular heat tube with a thickness of 1 mm. Adopting a copper water heat tube, when the water is under a 60 degree Celsius to 80 degree Celsius operation environment, there is an operation pressure less than 1 barometric pressure, the safety is relatively higher, also the latent heat amount of vaporization of water is 1.7 times larger than ammonia.

Since a water medium has a relatively high latent heat amount, the water amount poured into the heat tube can be reduced to avoid the water from being frozen during the night time of the moon and cause an expanding effect. Through multiple times of testing, it is determined that when a heat tube is poured 0.15 g of water, the requirements of the heat exchange are met. Through a −60 degree Celsius experiment can also avoid the expanding effect. As shown in the figures (such as FIG. 4), the heat tube is arranged radially towards both sides and upwards at the heat ending of the refrigeration fin.

The arrangement of the heat tube 13 (1301) is different according to different shapes of the radiators. As shown in the figures, each of two symmetrical radiators (no need to avoid the plug-in) is in half cylinder shape. The arrangement of the heat tubes is also basically symmetrical in a substantially uniform arrangement with two on each side and two upwards. Asymmetrical radiators (avoiding the plug-in and thus creating a gap which makes the radiators asymmetrical), however, are not configured with heat tube at a gap position.

In this embodiment, the light management system 23 includes a light guide tube 4 and a light-transmitting plate 401. The light-transmitting plate 401 is fastened on a cover plate 5 located on the top of the shell 1 through a method of light transmission inside and outside of the shell 1. The light guide tube 4 has a light lead-in end 404 404 and a light lead-out end 405 405, and it is fastened on the cover plate 5 on the top of the shell 1 by the manner that the light lead-out end 405 directly faces to the light-transmitting plate 401. As shown in the figures, the light guide tube 4 reflects and refracts incident light coming in from different angles. In this embodiment, light paths of light rays in the sell 1 are shown, the light rays are respectively 30 degrees and 60 degrees with the cover plate 5 of the shell 1. The light rays arrive at an upper surface of the creature growing substrate 8 through reflection, refraction and the like manners, forming an approximate uniform illumination condition, providing enough light to the plants.

As shown in the figures, a light guide hole is defined on the cover plate 5, the light-transmitting plate 401 is clung on an inner surface of the cover plate 5 corresponding to the light guide hole. An installation groove (with inner thread) used for horizontally limiting the light-transmitting plate 401 is defined on an inner side of the cover plate 5. The light-transmitting plate 401 is pressed in the installation groove to form a fastening and sealing effect through a cylindrical stud 402 which is provided with an external thread and in threaded fit with the installation groove. The light guide tube 4 extends into the light guide hole and is fastened on the light guide hole by means of bonding and the like. Since the light guide tube has no sealing features, the light-transmitting plate (light-transmitting glass plate) is added to work with the sealing ring 403 on an installation position of the light guide tube 4, and through fastening the cylinder stud of the light-transmitting plate 401 to press tightly and realize the sealing of this position. The light guide tube 4 is fastened on an upper part of the cover plate 5 through gluing with a 420 glue.

The heat insulation material layer is set around the light guide hole and is in lap joint with a heat insulation material layer of a shell upper cover, so that good heat insulation is maintained, and the description is not repeated here.

Figure 5:
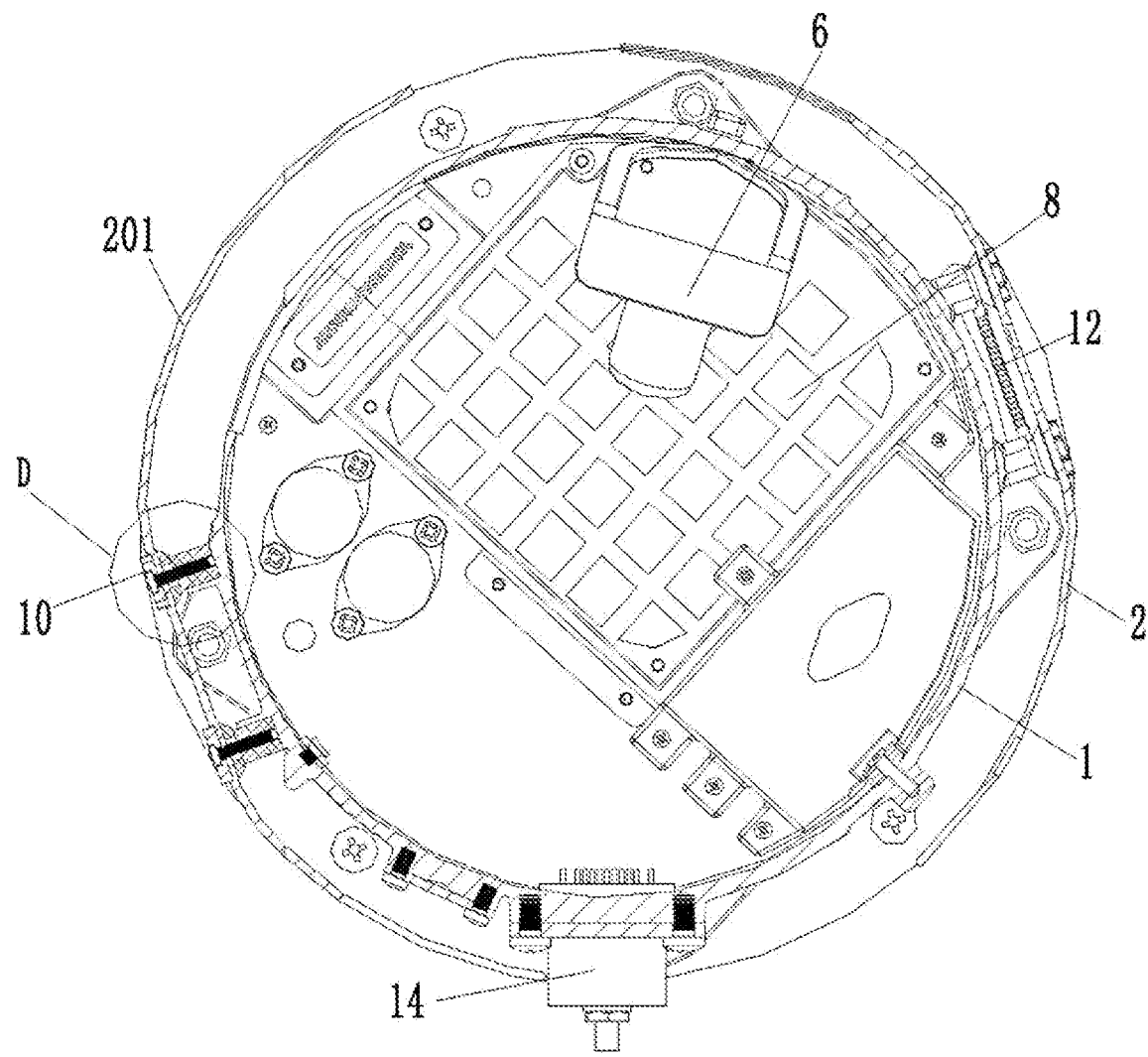
FIG. 5 is a cross-sectional view taken along B-B in FIG. 1.
Figure 6:
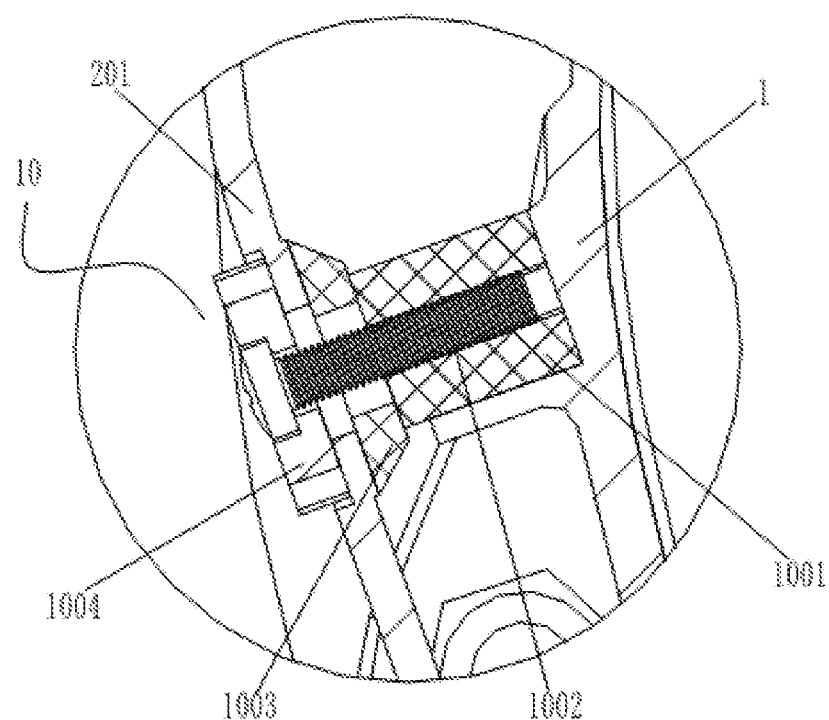
FIG. 6 is an enlarged view of portion D of FIG. 5.
Figure 7:
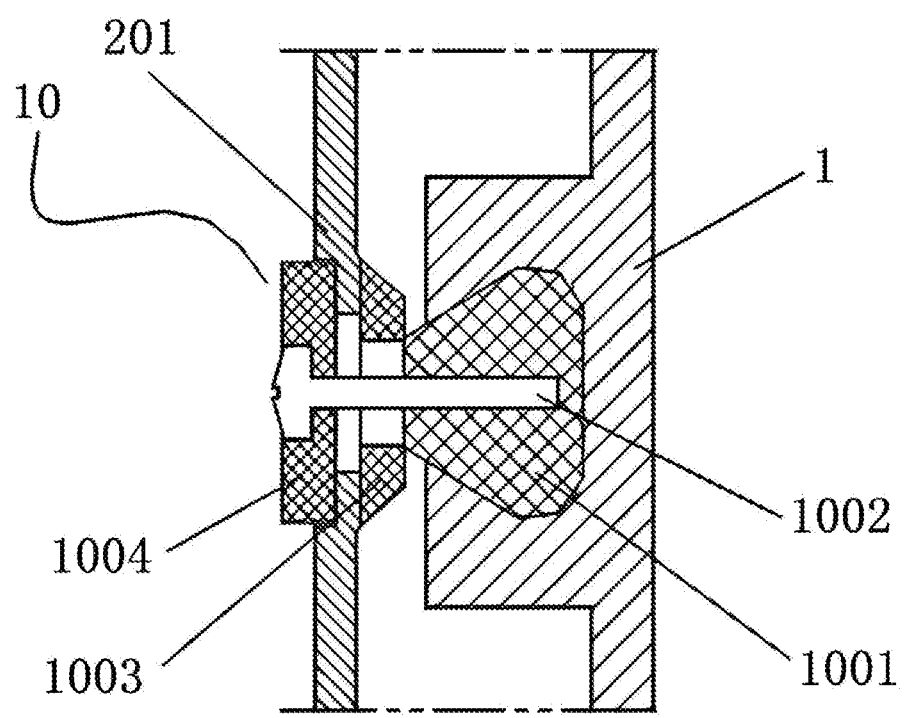
FIG. 7 is a layout view of heat preservation at a light conducting tube.
Figure 8:
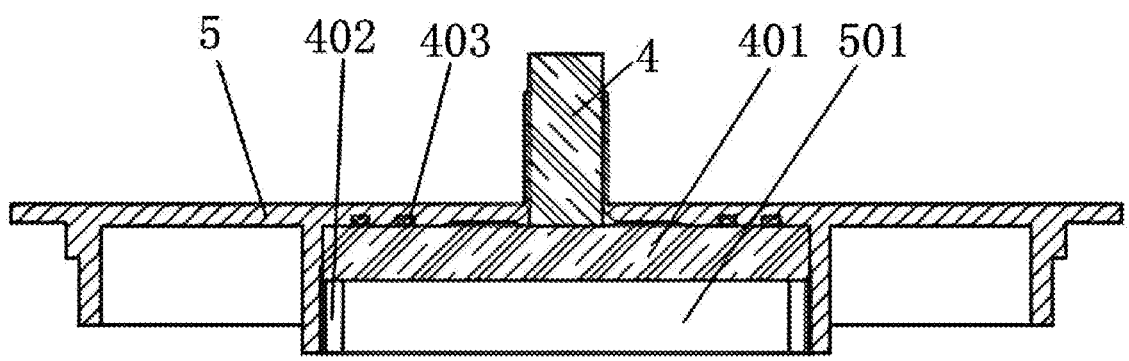
FIG. 8 is a structural view of a light management system.
Figure 9:
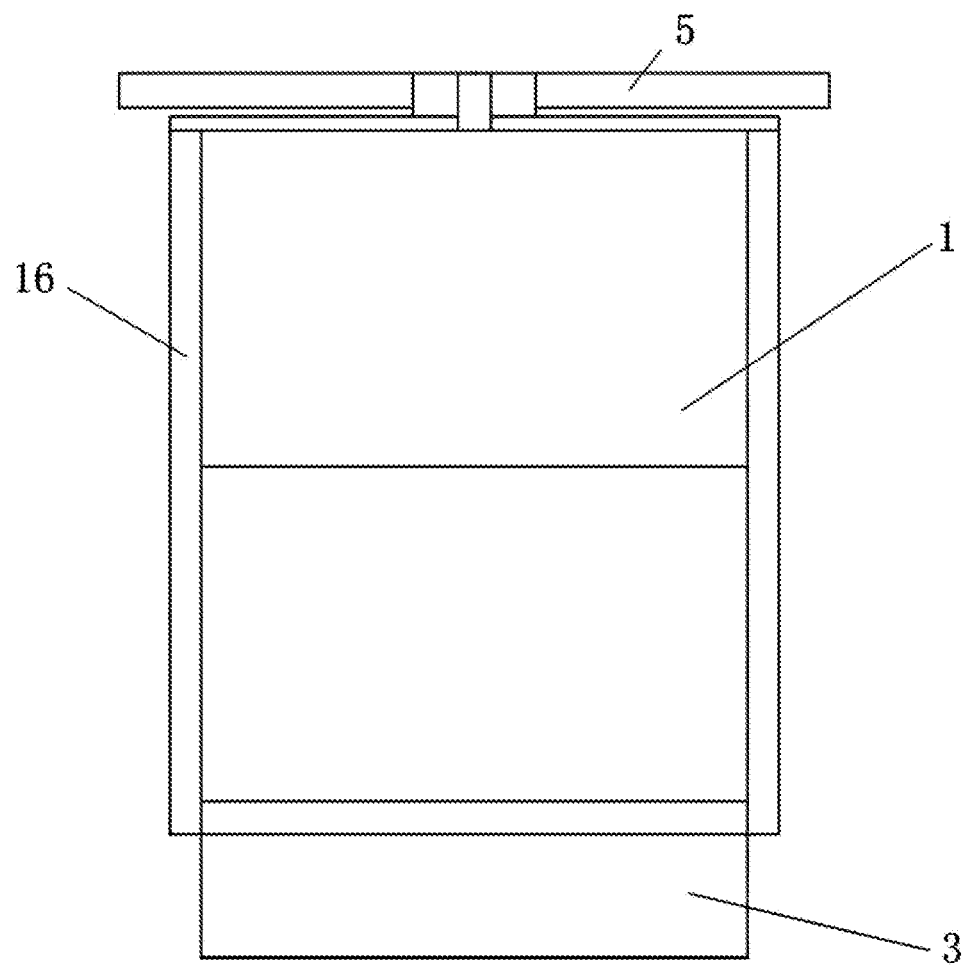
FIG. 9 is a schematic diagram of layout of thermal insulation materials.
Figure 10:
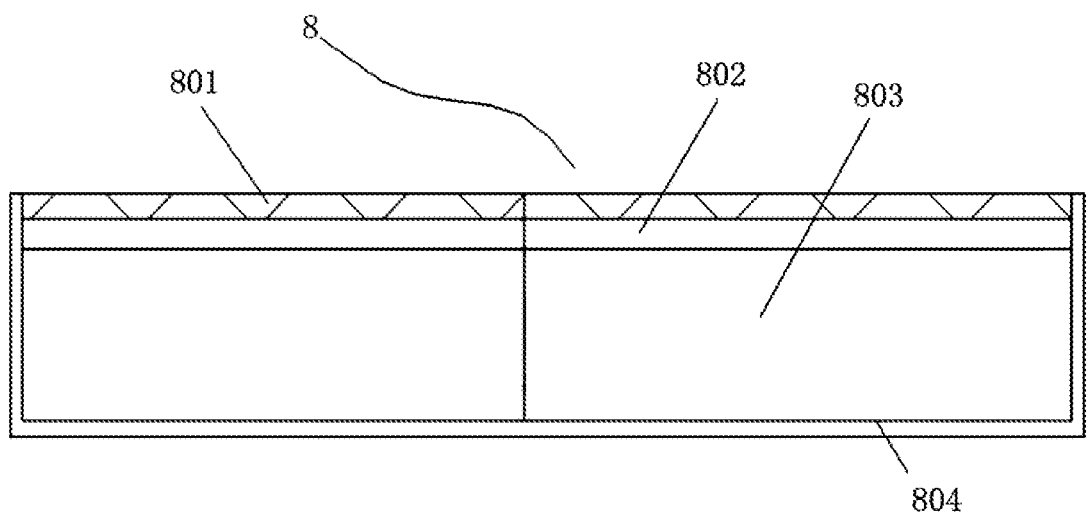
FIG. 10 is a schematic view of a structure of a growth substrate.
Figure 11:
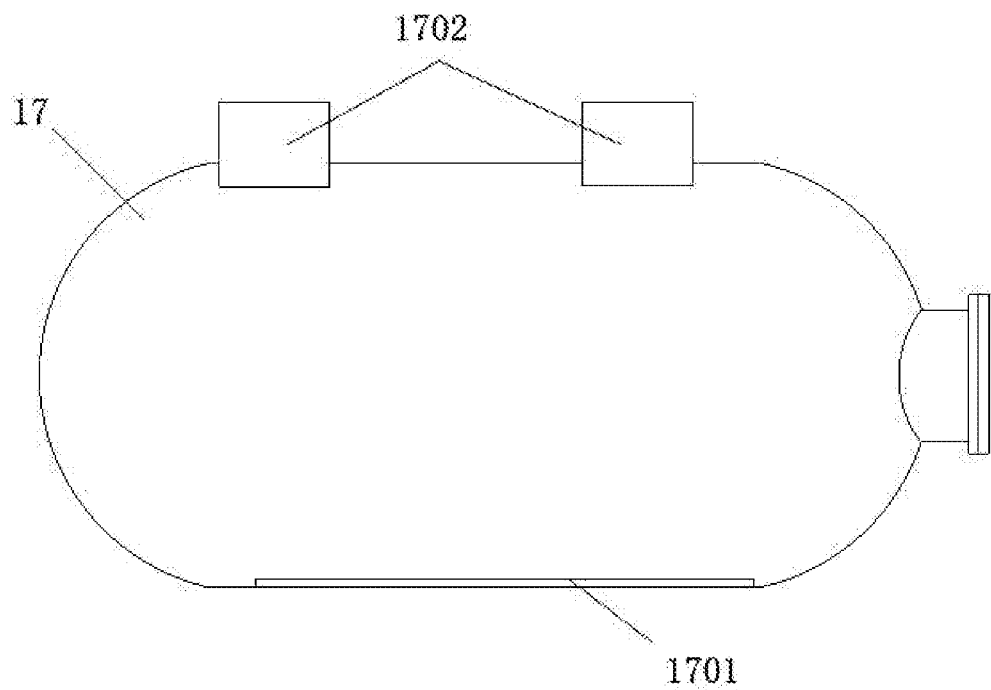
FIG. 11 is a schematic view of a structure of a frost cracking device.
Figure 12:
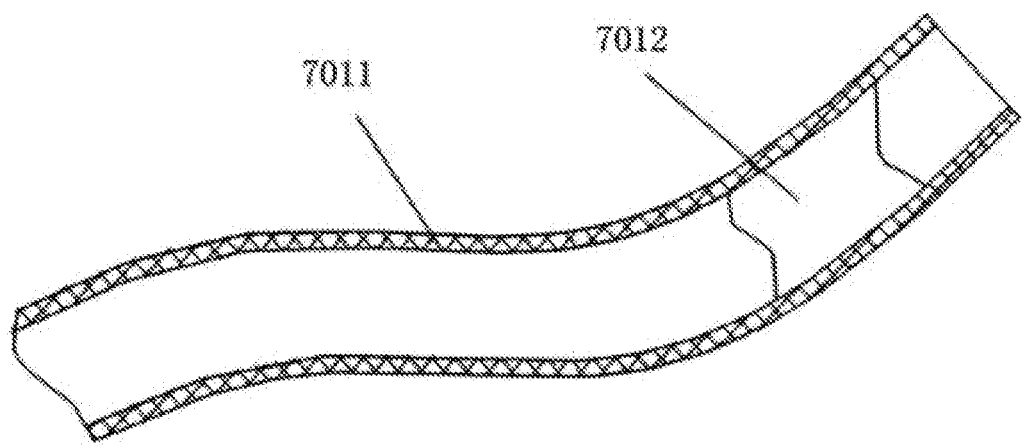
FIG. 12 is a schematic view of a structure of a pump outlet pipe (a nozzle is located at the growth substrate)
Figure 13:
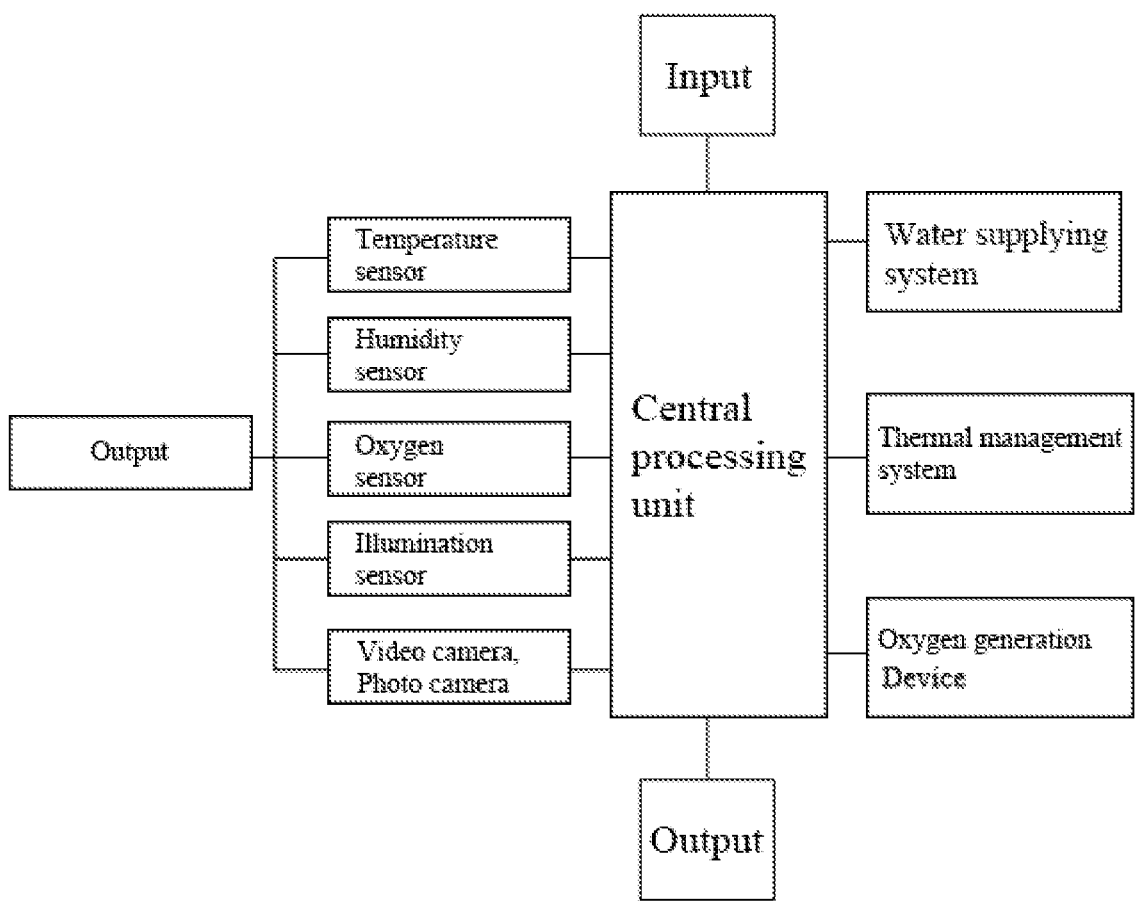
FIG. 13 is a control principle diagram of the present disclosure.
Figure 14:
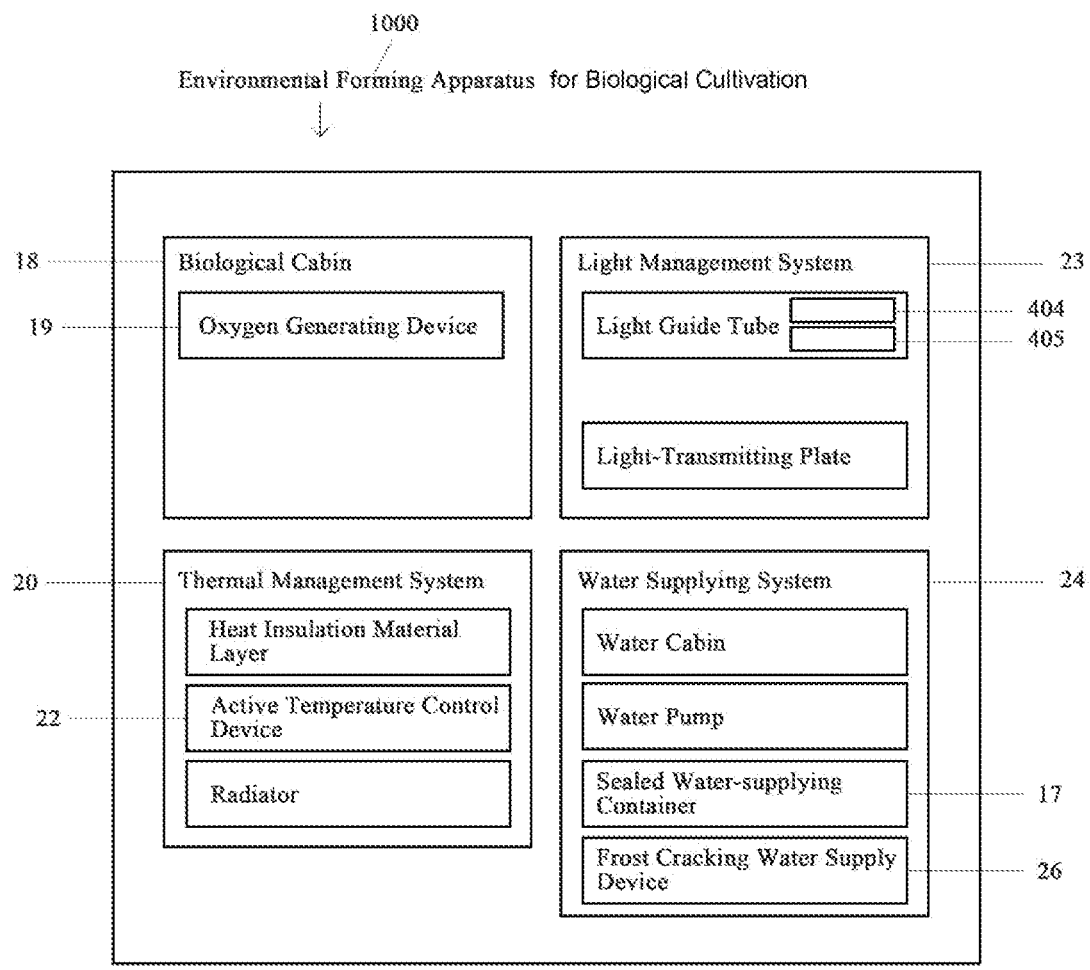
FIG. 14 is a structure diagram of the environment forming apparatus for biological cultivation in extraterrestrial space of the present disclosure.

In this embodiment, an oxygen generating system is included (not shown in the FIG. 5). It includes an oxygen container and an oxygen electromagnetic valve installed at an air outlet of the oxygen container. When the oxygen amount in the biological cabin 18 of the shell is significantly lower than a normal growth environment, the oxygen electromagnetic valve can be controlled to be opened, revealing proper oxygen, so that the balance of the air environment is ensured.

Oxygen with a set pressure can be contained in the oxygen container 171, or the oxygen can be directly prepared through chemical reaction, directly filling the oxygen container with oxygen is preferred, which is safe, and convenient to use.

In this embodiment, the light guide tube 4 is an optical fiber tube, made of a plurality of optical fiber bundle, with a good light conducting effect and the waste of light is low.

When in use, the apparatus also includes a monitoring system, which is used for monitoring and controlling environmental parameters required for adjusting the biological survival and growth of creatures, such as video monitoring, sensor (temperature, humidity, illuminance, oxygen and the like) monitoring, which is executed through a series of execution mechanisms (thermal management system 20s, water supply systems, etc.) to ensure effective monitoring and control to achieve proper environment.

The sensor (temperature, humidity, illuminance, oxygen and the like) is generally installed at a set position in the biological cabin 18, and an installation position 11 in the figures can be used for installing the sensor.

The monitoring system includes:

a signal collecting unit 25, at least configured for collecting parameters of temperature and humidity in the biological cabin 18. The signal collecting unit 25 usually includes a temperature sensor, a humidity sensor, an oxygen sensor and an illuminance sensor to obtain basic experimental data, supporting the studies of the survival and growth of creatures in extraterrestrial space;

a central processing unit 9, configured for receiving the parameter sent by the signal collecting unit 25 and determining whether the parameters are in a set range;

an executing unit, configured for receiving an execution order sent by the central processing unit and control the thermal management system 20 and the water supplying system, also used for adjusting the temperature and the humidity of the biological cabin 18.

In this embodiment, the monitoring system further includes a growth monitoring device, the growth monitoring device includes a camera 6 for obtaining growth procedures of the creatures. An outer surface of a camera lens is provided with an anti-fog layer, the anti-fog layer generally adopts an existing anti-fog coating or an anti-fog film, which can achieve an anti-fog effect, and can ensure that the whole process of biological growth can be clearly acquired under the condition of relatively large humidity; as shown in the figures, there are two cameras, mutually compensating shooting or photographing angles and respectively fastened at an upper space of a creature growing substrate space, and the lens should be pointing to the creature growing substrate.

As shown in the figures, the heat insulation material layer 16 (composed of a plurality of layers of heat insulation material) wraps the whole shell 1. The bottom of the shell 1 is also fixedly connected with a second shell 3 to install the central processing unit 9 (main controlling module), The central processing unit 9 includes a controller and a power management circuit, and the controller is connected with the outside (such as an airship control center) forming a wireless transmission (can also form a wired transmission with the control center of the airship itself) conversation, receiving orders, and sending a control command to a power management circuit and the camera, meanwhile, receiving data signals transmitted by the camera, a temperature sensor, a humidity sensor, an illuminance sensor, an oxygen sensor and the like in the biological cabin 18. A power-on command to the power management circuit according to the signal is sent. Adjustment of a refrigeration capacity of the refrigeration fin, starting or stopping of the electromagnetic water pump 701, starting and discharging oxygen of the oxygen generation device (the oxygen electromagnetic pump) and the like are completed, which is not described in detail here. Meanwhile, outer orders (from the earth or airships) can be transmitted directly to the central processing unit for realizing a control purpose. The central processing unit can also directly output the data and transmit the data to an outer device (on earth or in an airship), and the photo camera, video camera, temperature sensor, humidity sensor, illumination sensor, oxygen sensor can also output the data directly to an outer device (on earth or in an airship), which is not described in detail here. As shown, the second shell 3 and the shell 1 are separated, sealed from, and fastened with each other. The side surface and the bottom surface of the second shell 3 are subjected to blackening (aluminum alloy anode oxidation) treatment (the emitting rate is about 0.85), so that heat generation of the center processing unit is timely dissipated, avoiding a thermal deposition to make the lower part of the cabin over heated and deactivate the electronic components. Meanwhile, multiple layers of heat insulation materials are filled between the lower part of the shell and the upper part of the second shell to reducing an effect the second shell 3 creates upon the shell 1.

In order to seal the shell 1 from the external world, multiple static mechanical sealing structures are applied on the shell 1, which is belonged to the existing technology to seal a container. Detailed description is not repeated here.

The power sources required by the monitoring system and the executing unit are all generated from a loading system, an airship and the like for instance. Of course, it can also be a rechargeable battery, which can also fulfill the purpose of the present disclosure.

Last but not least, it is to be understood that the above embodiments are only used to illustrate the technical solutions of the present disclosure and are not intended to be limiting, although it will be understood by those of ordinary skill in the art that modifications or equivalent substitutions may be made to the technical solutions of the present disclosure without departing from the spirit and scope of the technical solutions of the present disclosure, all of which are intended to be encompassed by the claims of the present disclosure.

What is claimed is:

1. An environmental forming apparatus for biological cultivation in extraterrestrial space, comprising:
   a shell;
   a biological cabin configured in an upper space of the shell;
   a light management system configured in the upper space for importing light from external world for enabling biological growth;
   a thermal management system configured on the shell and configured for at least balancing a temperature of the upper space; and
   a water supplying system configured on the shell and configured for providing water for biological cultivation,
   wherein the light management system comprises a light guide tube and a light-transmitting plate, the light-transmitting plate is configured on an cover plate located on top of the shell in a manner of enabling light to go through inside or outside of the shell, a light lead-in end and a light lead-out end are configured on the light-transmitting tube, and the light guide tube is configured on the cover plate of the shell in a manner that the light lead-in end is directly facing the light-transmitting plate.

2. The environmental forming apparatus for biological cultivation in extraterrestrial space of claim 1, wherein the water supplying system comprises a water cabin and a water pump transporting water to the biological cabin, the water cabin is located in a lower space of the shell relative to the biological cabin.

3. The environmental forming apparatus for biological cultivation in extraterrestrial space of claim 2, wherein the water supplying system further comprises a frost cracking water supplying device and a sealed water-supplying container, the water supply sealed container is filled with water, upon a low temperature that water is frozen, the water supply sealed container is disabled, and after the temperature is back to normal and ice is melt, water is leaked from the water supply sealed container to a needed area in the biological cabin.

4. The environmental forming apparatus for biological cultivation in extraterrestrial space of claim 1, wherein an oxygen generating device that is configured to control oxygen releasing is set inside the biological cabin.

5. The environmental forming apparatus for biological cultivation in extraterrestrial space of claim 1, wherein the thermal management system comprises a heat insulation material layer set on an outer surface of the shell and an active temperature control device for keeping the temperature in the shell in a set range, the active temperature control device comprises a refrigeration fin clung on the shell.

6. The environmental forming apparatus for biological cultivation in extraterrestrial space of claim 5, wherein the thermal management system further comprises a radiator, the radiator is clung to a side of the refrigeration fin away from the shell, the radiator is fastened on the outer surface of the shell through a thermal insulation fastening assembly, pressing the refrigeration fin on the outer surface of the shell.

7. The environmental forming apparatus suitable for biological cultivation in extraterrestrial space of claim 6, wherein the thermal insulating fastening assembly comprises a heat insulation base fastened on the shell in an installation direction and a connecting nail, the connecting nail is configured to fasten the radiator on the thermal insulation base and press the refrigeration fin on the outer surface of the shell through the radiator.

8. The environmental forming apparatus for biological cultivation in extraterrestrial space of claim 5, wherein the active temperature control device further comprises an electric heating sheet set inside the shell.

9. The environmental forming apparatus for biological cultivation in extraterrestrial space of claim 1, wherein a bottom of the shell is further connected with a second shell, and the second shell and the shell are separately sealed.

* * * * *